United States Patent [19]

Kropf

[11] Patent Number: 4,597,219

[45] Date of Patent: Jul. 1, 1986

[54] VACUUM/GRAVITY FEED CONTACT HERBICIDE APPLICATOR

[75] Inventor: Walter K. Kropf, Harrisburg, Oreg.

[73] Assignee: Lee A. Smucker, Harrisburg, Oreg.

[21] Appl. No.: 637,116

[22] Filed: Aug. 2, 1984

[51] Int. Cl.$^4$ ............................................. A01M 21/00
[52] U.S. Cl. ........................................................ 47/1.5
[58] Field of Search ...................... 47/1, 5, 81; 405/43–46; 239/37, 39, 42–45; 119/156, 157; 47/1.5

[56] References Cited

U.S. PATENT DOCUMENTS

| | | | |
|---|---|---|---|
| 604,562 | 5/1898 | Evetts | 239/41 |
| 634,109 | 10/1899 | Hitchcock | 239/41 |
| 3,076,436 | 2/1963 | Newsome | 119/157 |
| 4,027,986 | 6/1977 | Patrick | 47/1.5 |
| 4,291,491 | 9/1981 | Maddock | 47/1.5 |
| 4,305,224 | 12/1981 | Maddock | 47/1.5 |
| 4,332,107 | 6/1982 | Reed | 47/1.5 |
| 4,357,779 | 11/1982 | Maddock | 47/1.5 |
| 4,369,596 | 1/1983 | Hartford | 47/1.5 |
| 4,403,881 | 9/1983 | Keeton | 47/1.5 |
| 4,409,755 | 10/1983 | Maddock | 47/1.5 |
| 4,426,807 | 1/1984 | Maddock | 47/1.5 |

FOREIGN PATENT DOCUMENTS

| | | | |
|---|---|---|---|
| 650317 | 10/1962 | Canada | 47/1.5 |
| 2120915 | 12/1983 | United Kingdom | 47/1.5 |

OTHER PUBLICATIONS

Weed Wiper Super-7, catalogue of Century Engineering, Cedar Rapids, Iowa, p. 19.

Primary Examiner—James R. Feyrer
Attorney, Agent, or Firm—Klarquist, Sparkman, Campbell, Leigh & Whinston

[57] ABSTRACT

A vacuum/gravity feed contact herbicide applicator includes a wicking head and an elevated container for gravity feeding herbicide liquid via an internal generally vertical conduit into the head. The container and conduit are sealed to maintain a partial vacuum. The wicking head is structured so that the liquid rises in a generally vertical internal passageway to a level limit by the partial vacuum such that the liquid does not overflow from an outlet opening of the passageway in an upper side of the wicking head. A first wicking material is disposed in the passageway for drawing the liquid upward through the outlet opening for transfer to a second wicking material surrounding the wicking head and covering the outlet opening. The wicking material is non-woven fibrous rayon fabric material impervious to air when saturated but pervious when unsaturated, to control passage of air into the wicking head and spillage of liquid from same. The conduit and passageway communicate through a single internal opening constricted so that the liquid and air interferingly counterflow therethrough to regulate the flow of air back into the container and thereby the flow of liquid into the wicking head passageway.

17 Claims, 7 Drawing Figures

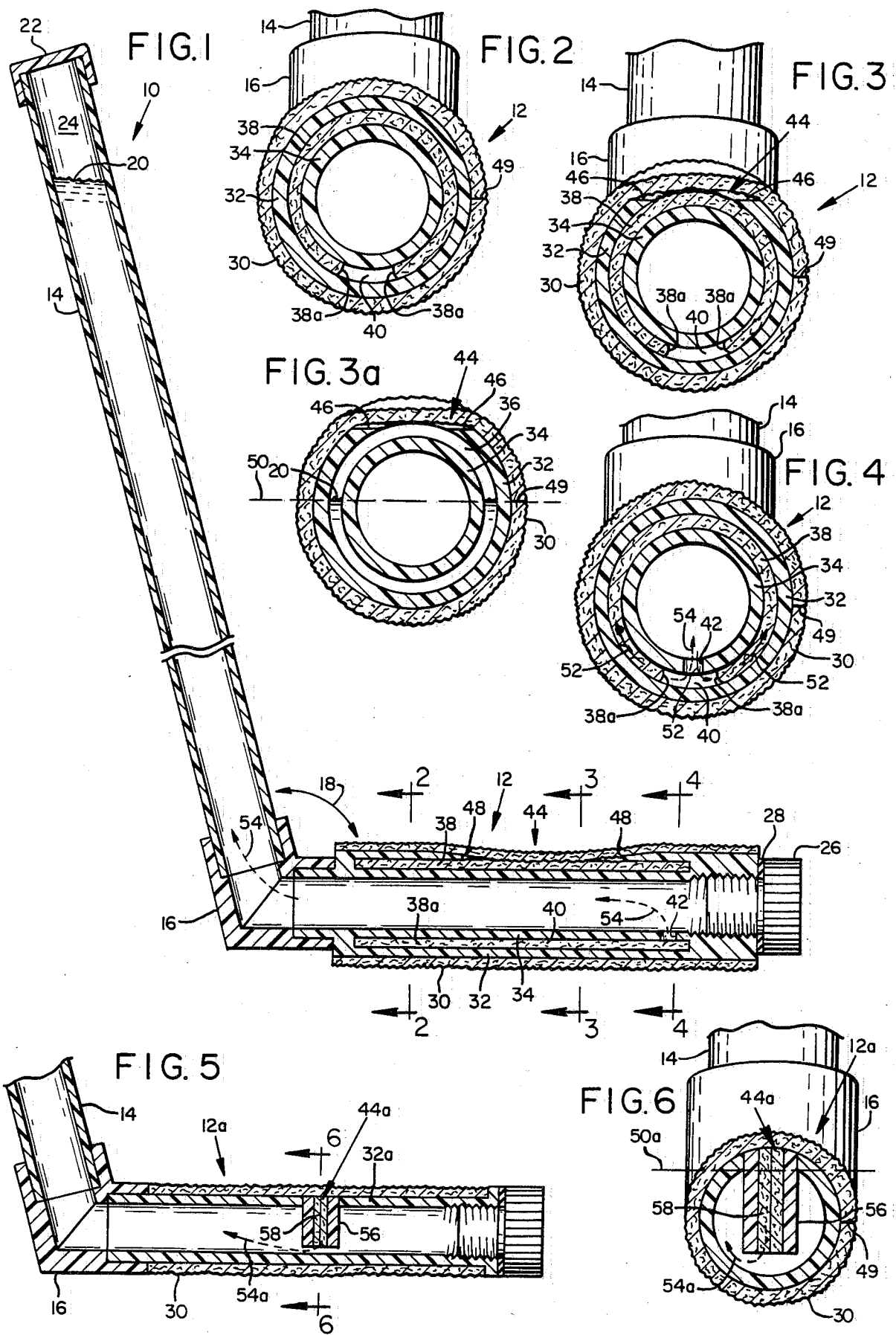

VACUUM/GRAVITY FEED CONTACT HERBICIDE APPLICATOR

BACKGROUND OF THE INVENTION

This invention relates generally to contact herbicide applicators and more particularly to hand-held contact herbicide applicators for gardening use.

Many systems have been developed for applying liquid herbicides to weeds. Aside from spraying, most herbicide applicators employ a contact applicator head or wiper bar designed to be saturated with herbicide liquid and wiped over the weeds. Herbicide is thereby transferred from the surface of the applicator to the weeds. Contact herbicide applictors have come to be generally preferred over spray applicators in certain situations, in particular to apply nonselective herbicides such as ROUNDUP to weeds growing among desirable vegetation. However, such herbicides are expensive. Therefore, an important concern is to minimize waste. Controlling dripping is also important to protect desirable plants.

Hand-held contact herbicide applicators are primarily used for lawns and gardens. Some applicator designs simply provide handles with an absorbent head or mop which is dipped into a container of herbicide. Another common design is a hockey-stick shaped tool which uses an internal gravity feed system with the flow rate to the wiper or wicking head regulated by an operator-controlled valve.

For example, U.S. Pat. Nos. 4,291,491; 4,305,224 and 4,357,779 to Maddock generally disclose applicators having a vented storage chamber at the top of the handle for herbicide liquid and a drip valve in the handle for metering a predetermined amount of fluid down the handle to a wicking head. The operator must adjust the valve setting to match herbicide flow to the rate at which weeds are wiped. Too much flow and the wicking head drips and wastes herbicide. Too little and not enough herbicide is wiped on the weeds. Hence, frequent operator adjustment is required.

Other hand-held contact applicators are known, such as U.S. Pat. No. 4,409,755 to Maddock, which use the entire handle as the reservoir for the liquid. An orifice is provided at a joint between the wicking head and the handle for metering herbicide liquid into the wicking head. The foregoing forms of applicators ordinarily tend to supply too much liquid to the wicking head, resulting in leakage and waste of the expensive herbicide liquid and damage to desired plants.

Another hand-held herbicide applicator designed particularly for spot-applying herbicide by direct contact with woody-type vegetation is disclosed in U.S. Pat. No. 4,027,986 to Patrick. That applicator uses a hollow handle for storage of herbicide liquid and a partial vacuum is maintained at the top of the handle. An operator-controlled air-bleed valve at the top end of the handle is actuated to bleed air into the handle to regulate an otherwise free flow of liquid into the applicator head. While this system enables better control of the flow of herbicide liquid to the wicking head, it still requires the operator to adjust a valve often to assure an adequate yet not excessive supply of liquid herbicide.

U.S. Pat. No. 4,403,881 to Keeton uses an upper portion of the handle to store herbicide liquid above a diaphragm with a small slit extending through it. A manual pump mechanism is provided at the top of the handle to expel a small amount of liquid at a time through the slit. This design also requires frequent action by the operator to provide an adequate amount of liquid to the applicator head.

U.S. Pat. No. 4,369,596 to Hartford discloses a contact herbicide applicator for mounting on the back of a lawnmower. Hartford uses a feed arrangement for supplying herbicide liquid from an elevated tank under a partial vacuum to a large-diameter tube which is partially-filled to serve as a wiper bar. The herbicide liquid is dispensed into a surrounding wicking material through a plurality of holes in rows extending horizontally along the opposite sides of the wiper bar. Such an apparatus appears to alleviate the need for manual control but continuously feeds liquid herbicide to the wiper bar, and therefore would likely drip when not actually wiping. Also, anytime the wiper bar is tilted from horizontal, the supply of liquid to the wicking material would be uneven and dispensing of liquid from the tank would either cease or increase depending on the direction of tilt.

For agricultural field use, U.S. Pat. No. 4,332,107 to Reed discloses a multi-layer applicator wiper bar mounted on the front end of a tractor. Herbicide liquid is gravity-fed to surrounding wicking material through rows of holes extending along the wiper bar. The flow of liquid herbicide is regulated by adjusting the liquid pressure or head at the wiper bar by raising or lowering a tank of liquid herbicide carried on the tractor. Like the hand-held applicators, this system also requires constant monitoring by the operator to assure an adequate yet not excessive flow of herbicide liquid to the wiper bar.

A commercially-available wiper bar similar to Reed's is the Weed Wiper Super-7 TM offered by Century Engineering, P.O. Box 3018, Cedar Rapids, Iowa 52406. Flow of liquid herbicide from a reservoir tank to the wiper bar is controlled by an operator-actuated solenoid valve. Excess liquid flow easily occurs with this system, which wastes herbicide and could damage the crops. This wiper bar, as well as those disclosed above, requires constant operator supervision for proper herbicide feed rates.

Therefore, a need remains for a liquid herbicide applicator which automatically regulates the proper amount of liquid herbicide to assure an adequate yet not excessive flow of herbicide liquid to the wiper head or bar.

SUMMARY OF THE INVENTION

One object of the invention is to provide an improved contact herbicide applicator which eliminates wastage of liquid herbicide.

A second object of the present invention as aforementioned is to eliminate the need for adjustments by the operator to use the applicator.

Another object of the invention is automatically to control the liquid herbicide feed rate to insure an adequate, yet not excessive, flow of liquid herbicide under all ordinary operating conditions.

Yet another object of the invention is to provide a contact herbicide applictor which proportions the feed of liquid herbicide to the actual amount of weeds which are contacted by the wiper bar.

A hand-held herbicide applicator in accordance with the present invention comprises a wiper head having an enclosed vessel and an elevated source of herbicide liquid which is fed through a generally vertical conduit into a lower portion of the vessel. A passageway in communication with the conduit at the lower portion of the vessel extends generally vertically from the lower portion of the vessel to an outside outlet along an upper side of the vessel. A first wicking means is wrapped at least partially around a portion of the vessel including the upper side thereof for contact application of the liquid from the vessel to vegetation.

The liquid herbicide source is elevated above the wiper head so as to create a head of pressure such that liquid is gravity fed to the wiper head. The source is also closed to the atmosphere and of fixed volume so as to apply a partial vacuum to the liquid to reduce the head pressure of the liquid at the wiper head such that a liquid level in the passageway is limited to a level spaced below the outlet. A second wicking means is disposed in the passageway for conducting an amount of the herbicide liquid upwardly from such level to the first wicking means. As the liquid-saturated wiper head is wiped across a stand of weeds, herbicide liquid is transferred to the surface of the weeds. As liquid is removed from the first or outer wicking means, it is replenished automatically by liquid drawn upwardly in the passageway to the outlet. Additional herbicide liquid then flows into the passageway in a metered flow controlled by the partial vacuum in the source cooperatively with the admission of ambient air through the passageway and conduit of the wicking head, to provide replacement herbicide to the head at the same rate at which herbicide is transferred to the weeds.

In a preferred embodiment, the vessel comprises a pair of elongated concentric tubes spaced radially apart and connected at their ends, defining an elongated annular passageway. A fluid inlet opening to the passageway is positioned at the bottom of the inner tube to communicate with the inside thereof, and the outlet is positioned at the top of the outer tube. The outer concentric tube is encircled with a wicking material defining the first wicking means. The inner concentric tube has wrapped around its lateral and upper sides a wicking material defining the second wicking means. The fluid inlet opening is preferably a single opening but can be provided by two or more openings closely spaced together. In operation, liquid flows in one direction through the opening, and air flows in the opposite direction. Preferably, the single opening means is sized to constrict the counterflows so that they mutually interfere to help meter fluid flow. The inner wicking material is wrapped only part way around the inner tube; its ends are spaced laterally apart along the lower side of the inner tube to provide an open channel to enable liquid to flow from the inlet opening axially along the lower side of the wiper bar. This arrangement facilitates uniform absorption of liquid herbicide by the wicking material along the length of the annular passageway and facilitates flow of return air to the inlet opening.

It is preferable to limit the length of the fluid outlet means at the top of the outer tube such that the wiper bar can be tilted at an angle from horizontal without creating excess or uneven liquid flow. The wicking means is preferably of a non-woven felt material that is impervious to air when saturated to retard flow of air into the outlet opening until the liquid is depleted. These features prevent spillage of the liquid herbicide from the head when the applicator head is agitated or tilted.

The foregoing and other objects, features, and advantages of the invention will become more readily apparent from the following detailed description of a preferred and alternate embodiment of the invention which proceeds with reference to the accompanying drawings.

BRIEF DESCRIPTION OF THE DRAWINGS

FIG. 1 is a vertical sectional view of a hand-held vacuum gravity-feed applicator according to the invention.

FIG. 2 is a cross-sectional view taken along lines 2—2 in FIG. 1.

FIG. 3 is a cross-sectional view taken along lines 3—3 in FIG. 1.

FIG. 3A is a cross-sectional view similar to FIG. 3 but with the inner layer of wicking material omitted to illustrate the ordinary level of filling of the wicking head under the influence of a partial vacuum in the handle of the applicator.

FIG. 4 is a cross-sectional view taken along lines 4—4 in FIG. 1.

FIG. 5 is a view similar to FIG. 1 of the wicking head of a second embodiment of the invention.

FIG. 6 is a cross-sectional view of the applicator head of FIG. 5 taken along lines 6—6.

DETAILED DESCRIPTION OF PREFERRED EMBODIMENTS

FIG. 1 Embodiment

In a first embodiment of the invention, FIGS. 1-4 show a herbicide applicator 10 having a wicking head 12 and a handle 14 interconnected by a joint 16 at an angle 18, preferably near 70°. Handle 14 is a hollow tube for containing a supply of herbicide liquid 20 and is enclosed at its upper end by a cap 22 and sealed to sustain a partial vacuum in space 24 above the liquid. Herbicide liquid is introduced to the tubular handle through the end of the wicking head which is provided with a threaded stopper 26 and washer 28. The applicator is turned upside down for filling and when it is returned to an upright position, as shown in FIG. 1, liquid 20 completely fills the inside of wicking head 12 and forms a partial vacuum in space 24 at the top of the handle. This vacuum limits the liquid pressure or head in the wicking head. The handle is made of transparent plastic tubing so that the user can see the level of liquid 20.

The wicking head itself is a tubular structure, arranged to cooperate with handle 14 to supply liquid 20 to a surrounding wicking material 30 only in an amount sufficient to replenish that which is removed by contact application. As explained further hereinafter with reference to FIG. 3a, the liquid is maintained by the partial vacuum in the handle at a level 50 in the wicking head below an overflow level and is drawn upward from that level into the surrounding wicking material. The wicking head is preferably assembled using plastic pipe and fittings or formed of plastic moldings.

The first embodiment of the wicking head shown in FIGS. 1-4 comprises a pair of concentric cylindrical tubes 32, 34 spaced radially apart and interconnected at their ends to provide an elongated annular space or passageway 36 between them, best seen in FIG. 3a. A non-woven felt-like synthetic chamois fabric material 38 is wrapped around the inner tube 34 in annular space 36. A gap is left between the ends 38a of material 38 at the bottom of space 36 to provide an open channel 40 running along the entire length of the space.

An opening 42 is provided in the lower side of the inner tube near the distal or stoppered end of the wicking head, as best seen in FIG. 4, for liquid to flow from inside the inner tube into annular space 36. The liquid flows axially along channel 40 and wicking material 38 draws the liquid circumferentially upward in the annular passageway around the inner tube to an axially elongated opening 44 in the upper side of the outer tube. The inner and outer layers 38, 30 of the felt wicking material are in contact between the sides 46 and ends 48 of opening 44 so that the inner layer saturates the outer layer with herbicide liquid. Opening 44 is sized to less than the axial length of annular space 36 so that the head can be tilted from horizontal in normal use, e.g., at 20°-30°, without the liquid in space 36 overflowing from the ends of the opening. Opening 42 is positioned axially adjacent the distal end 48 of opening 44.

The entire wicking head is surrounded by the aforementioned outer layer 30 of the same type of material as layer 38. The preferred wicking material is a non-woven non-rubberized rayon fabric commercially sold as a synthetic chamois material, for example, under the brand name SUNTEX, by European Promotions Inc., P.O. 45987, Los Angeles, Calif. 90005. The preferred material has the characteristic that only when saturated with liquid, it is impervious to air. The ends of layer 30 are joined at a seam 49 extending lengthwise along a lateral or lower, but not upper side, of the wicking head, so as not to leak air through the seam. Additional layers with overlapping seams can also be used, but should not extend over opening 44. For example, a second layer or axial strip (not shown) can be provided to cover the lower half of the wicking head. Also, an outer protective layer of open mesh nylon netting may be used to retard wear of wicking material. Alternatively, a synthetic napped material similar to that used in a car wash mitt may be used on the lower wiping surface.

Operation of FIG. 1 Embodiment

The wicking head 12 acts in combination with handle 14 as a bubbler device to meter liquid herbicide into the wicking head. The partial vacuum in space 24 and ambient air pressure limit the downward pressure of the column of liquid stored in the handle to control the amount of fluid discharged through opening 42 into the annular passageway. As shown in FIG. 3a, with the inner synthetic chamois layer 38 omitted to illustrate operation, the ambient air pressure and partial vacuum in space 24 tend to maintain the level of the liquid at the elevation of horizontal line 50, spaced between opening 44 and opening 42. Referring to FIG. 4, liquid herbicide is drawn upwardly from the liquid level inside space 36 by the wicking action of the inner fabric layer 38, as indicated by arrow 52, and is transferred to layer 30. As the liquid level drops and fabric material 38 is desaturated, bubbles of air intermittently flow downwardly through annular space 36 to channel 40, through opening 42, and upwardly within tube 34 and handle 14 into space 24, as indicated by arrow 54. The partial vacuum in space 24 is thereby reduced, allowing additional liquid to enter space 36 to restore the level therein. The herbicide liquid is then transferred from the outer layer onto plants in conventional fashion.

Other features of the wicking head also aid in metering discharge of the liquid. Inlet opening 42 is preferably sized so that the counterflows 52, 54 of liquid and air mutually interfere with, but do not block, passage of one another through opening 42. A hole diameter of 3/16" is preferred—less than about 1/8" diameter blocks the flow through the inlet opening and more than about 1/4" allows excessive flow, causing some dripping. Also, as mentioned above, saturation of the outer wicking layer 30 effectively seals opening 44 against leakage of air into the annular space until the outer layer becomes partially dry by the transfer of liquid to weeds. This arrangement minimizes the discharge of liquid into and overflow from the wicking head merely as a result of slight agitation or tilting when the outer layer is already saturated.

FIG. 5 Embodiment

In a second embodiment of the invention, FIGS. 5 and 6 show a somewhat simpler form of wicking head 12a which has only an outer tube 32a and surrounding outer layer 30. Instead of an inner tube spaced inwardly to form an annular passageway, it has a tubular passageway or well 56 extending radially downwardly from an opening 44a in the top of tube 32a nearly to the bottom of the tube. Similarly, instead of an inner surrounding layer, well 56 is filled with a plug 58 of wicking material like material 38. This embodiment functions in a manner similar to the FIG. 1 embodiment. The handle and head cooperate to maintain liquid at a level 50a in well 56 below which it would overflow. Material 58 draws liquid upward from the well and transfers it to layer 30. When the liquid level drops sufficiently in the well, air bubbles are admitted into tube 32a, as indicated by arrow 54a, and liquid flows the opposite direction into the well.

Other variations can be made in the invention. In a hand-held contact herbicide applicator, the wicking head is preferably about 6-8" long. For other uses, it can be longer, not exceeding 30", with the best operation in a length of up to about 15". For uses in which the wicking head is likely to be tilted equally in either direction from horizontal, inlet opening 42 can be centered under outlet opening 44. The length of opening 44 is 2"×3/4" in one example of wicking head 12, but can also be altered, for example, to provide a greater length of contact area between layers 30, 38 or for longer wicking heads. However, the length of the opening should not be so great that, when the wiping head is tilted within a normal range of operation, the level of liquid rises above opening end 48. Inlet opening 42 should also be positioned to remain submerged during normal operation. It may also be desired to provide a greater maximum liquid flow volume without impairing control of flow rate, such as in an elongated wicking head. This is preferably done by providing a second opening (not shown) laterally adjacent opening 42.

Having illustrated and described the principles of my invention in two embodiments and additional variations thereof, it should be apparent to those skilled in the art that the invention can be modified in arrangement and detail without departing from such principles.

I claim all modifications coming within the spirit and scope of the following claims:

1. An apparatus for contact application of liquid herbicide comprising:
    a wiper head comprising an enclosed vessel;
    a source of herbicide liquid;
    means defining a generally vertical conduit for liquid to flow from the source into a lower portion of the vessel;
    means defining a passageway in communication with the conduit at the lower portion of the vessel and extending generally vertically from the lower portion of the vessel to an outside outlet opening along an upper side of the vessel;

a first wicking means comprising a non-woven, fibrous synthetic chamois material wrapped at least partially around a portion of the vessel including the upper side thereof for contact application of the liquid from the vessel to vegetation;

the source being elevated above the wiper head so as to create a head of pressure such that liquid is gravity fed to the wiper head and being closed to the atmosphere and of a predetermined volume so as to apply a partial vacuum to the liquid to provide a reduced pressure of the liquid at the wiper head such that a liquid level in the passageway is limited to a level spaced below the outlet opening; and second wicking means disposed in the passageway for conducting an amount of said liquid upwardly from said level to said outlet for transfer to the first wicking means.

2. The apparatus according to claim 1 in which the vessel is an elongated tube.

3. The apparatus of claim 1 wherein the felt-like non-woven fibrous material seamlessly covers at least the outlet opening on the upper side of the vessel and extends contiguously over a lateral side of the vessel.

4. The apparatus of claim 1 wherein the vessel is elongated and the outside outlet along the upper side of the vessel is limited in length such that the wiper bar can be tilted lengthwise at a predetermined angle from horizontal without causing said liquid flow therefrom.

5. The apparatus of claim 4 wherein the fluid outlet is approximately 2" long and ¾" wide.

6. The apparatus of claim 4 wherein the conduit and the passageway communicate through a fluid inlet opening means positioned in a lower portion of the vessel longitudinally adjacent one end of the outlet opening.

7. The apparatus of claim 1 wherein the conduit and the passageway communicate through a single fluid inlet which is between ⅛" and ¼" in diameter.

8. The apparatus of claim 1 has an elongated tubular handle sized such that the apparatus can be hand-held and to contain the liquid herbicide, the handle being transparent for viewing a level of the liquid therein.

9. A vacuum/gravity feed contact herbicide applicator comprising:

a wicking head;

an elevated container for gravity feeding herbicide liquid via an internal generally vertical conduit into the wicking head, the container and conduit being arranged to maintain a partial vacuum;

means defining a generally vertical internal passageway in the wicking head arranged so that liquid rises in the passageway to a level limited by the partial vacuum such that the liquid does not overflow from an outlet opening of the passageway in an upper side of the wicking head;

a first wicking material surrounding the wicking head and covering the outlet opening;

a second wicking material disposed in the passageway for drawing the liquid upward from said level through the outlet opening for transfer to the first wicking material;

at least the first wicking material being a non-woven fibrous fabric material impervious to air when saturated but pervious when unsaturated for controlling a flow of air into the wicking head and spillage of liquid from same;

the conduit and passageway communicating through a single internal opening constricted so that the liquid and air interferingly counterflow therethrough to regulate the flow of air into the container and thereby the flow of liquid into the wicking head passageway.

10. An apparatus for contact application of liquid herbicide comprising:

a wiper head comprising an enclosed vessel;

a source of herbicide liquid;

means defining a generally vertical conduit for liquid to flow from the source into a lower portion of the vessel;

means defining a passageway in communication with the conduit at the lower portion of the vessel and extending generally vertically from the lower portion of the vessel to an outside outlet opening along an upper side of the vessel;

a first wicking means wrapped at least partially around a portion of the vessel including the upper side thereof for contact application of the liquid from the vessel to vegetation;

the source being elevated above the wiper head so as to create a head of pressure such that liquid is gravity fed to the wiper head and being closed to the atmosphere and of a predetermined volume so as to apply a partial vacuum to the liquid to provide a reduced pressure of the liquid at the wiper head such that a liquid level in the passageway is limited to a level spaced below the outlet opening;

second wicking means disposed in the passageway for conducting an amount of said liquid upwardly from said level to said outlet for transfer to the first wicking means; and an elongated tubular handle sized such that the apparatus can be hand-held and to contain the liquid herbicide, the handle being transparent for viewing a level of the liquid therein;

the wiper head including means for filling the handle with liquid herbicide from the end of the wiper bar opposite the handle and the handle being sealed against leakage of air and liquid.

11. The apparatus of claim 8 wherein the handle and wiper bar are interconnected at an angle of approximately 70°.

12. An apparatus for contact application of liquid herbicide comprising:

a wiper head comprising an enclosed vessel;

a source of herbicide liquid;

means defining a generally vertical conduit for liquid to flow from the source into a lower portion of the vessel;

means defining a passageway in communication with the conduit at the lower portion of the vessel and extending generally vertically from the lower portion of the vessel to an outside outlet opening along an upper side of the vessel;

a first wicking means wrapped at least partially around a portion of the vessel including the upper side thereof for contact application of the liquid from the vessel to vegetation;

the source being elevated above the wiper head so as to create a head of pressure such that liquid is gravity fed to the wiper head and being closed to the atmosphere and of a predetermined volume so as to apply a partial vacuum to the liquid to provide a reduced pressure of the liquid at the wiper head such that a liquid level in the passgeway is limited to a level spaced below the outlet opening; and second wicking means disposed in the passageway for conducting an amount of said liquid upwardly from said level to said outlet for transfer to the first wicking means;

the vessel comprising a pair of elongated concentric tubes spaced radially apart and connected at their ends to define an annular portion of said passageway;

a fluid inlet opening means to the passageway positioned at the bottom of the inner tube communicating with the inside thereof; and said outlet opening being positioned at the top of the outer tube which can be midway between its ends;

the inner concentric tube having wrapped around its lateral and upper sides a wicking material defining the second wicking means;

the outer concentric tube being encircled with a wicking material defining the first wicking means.

13. The apparatus of claim 12 wherein the inner tube is sized such that its upper side is spaced above a maximum equilibrium surface level of the liquid.

14. The apparatus of claim 12 wherein the fluid inlet opening means to the passageway at the bottom of the inner tube is a single opening.

15. The apparatus of claim 12 wherein the fluid outlet means at the bottom of the inner tube is a single opening and the inner wicking material has circumferential ends spaced laterally apart along the bottom side of the inner tube to provide an open channel to enable liquid from the inlet opening to flow axially along the wiper bar, thereby facilitating absorption of liquid herbicide by the wicking material uniformly lengthwise of the wiper head and facilitating flow of return air to the inner tube opening.

16. In an apparatus for contact application of liquid herbicide to a stand of vegetation, a method for regulating herbicide release, comprising:

providing a source of herbicide liquid;

providing a contact wiper means including an enclosed vessel in communication with said source, a wicking means extending around a portion including an upper side of the vessel for absorbing and contactingly transferring the liquid to vegetation, and means defining a passageway in communication with the source extending generally vertically from inside a lower portion of the vessel to an outlet opening at said upper side thereof;

elevating the source above the wiper means to create a head pressure such that liquid can be gravity fed by the source to the wiper means;

applying a partial vacuum to the source so as to reduce the head pressure of the liquid at the wiper means such that a liquid level in the passageway is limited to a level within the vessel nonoverflowingly spaced below the outlet opening on the upper side of the vessel;

admitting an amount of air, through the passageway of the vessel into the source to regulate said vacuum;

constricting a portion of the passageway so that the air and liquid interferingly counterflow through the passageway portion; and wicking a portion of the liquid upward in the passageway from said level to outside the vessel to the wick means at the upper side thereof to transfer same to the wick means around the vessel.

17. In an apparatus for contact application of liquid herbicide to a stand of vegetation, a method for regulating herbicide release, comprising:

providing a source of herbicide liquid;

providing a contact wiper means including an enclosed vessel in communication with said source, a wicking means extending around a portion including an upper side of the vessel for absorbing and contactingly transferring the liquid to vegetation, and means defining a passageway in communication with the source extending generally vertically from inside a lower portion of the vessel to an outlet opening at said upper side thereof;

elevating the source above the wiper means to create a head pressure such that liquid can be gravity fed by the source to the wiper means;

applying a partial vacuum to the source so as to reduce the head pressure of the liquid at the wiper means such that a liquid level in the passageway is limited to a level within the vessel nonoverflowingly spaced below the outlet opening on the upper side of the vessel; and wicking a portion of the liquid upward in the passageway from said level to outside the vessel to the wick means at the upper side thereof to transfer same to the wick means around the vessel;

admitting an amount of air through the passageway of the vessel into the source to regulate said vacuum; and completely covering the outlet opening of the passageway with said wick means and saturating the wick means with said liquid to block admission of air into the passageway until sufficient of said quantity of liquid is dispensed by contact application to vegetation for the wick means to allow air to pass therethrough.

* * * * *